Patented Jan. 22, 1935

1,988,985

UNITED STATES PATENT OFFICE 1,988,985

MANUFACTURE OF TANNING SUBSTANCES

Josef Schäfer, Basel, Switzerland, assignor to the firm of J. R. Geigy A. G., Basel, Switzerland No Drawing. Application August 24, 1934, Serial No. 741,349. In Germany September 16, 1933

3 Claims. (Cl. 149—5)

This invention is an improvement in or a modification of that described in U. S. specification No. 1,901,536.

That specification describes a manufacture of tanning agents by heating in an acid solution the sulphonic acid of an aromatic hydrocarbon together with formaldehyde and a dioxydiphenyl sulphone. It is not possible in this process to replace the sulphonic acid of the hydrocarbon by a sulphonic acid of a phenol, since in this case there would be formed, in the course of the condensation, resins which are insoluble in water and are, as such, themselves useless for tanning purposes. Also it is not possible to combine sulphonic acids of phenols with the valuable dioxydiphenyl sulphones to produce tanning substances by means of the sequence of reactions described in U. S. application Ser. No. 629,239, filed August 17, 1932, that is to say by the action of formaldehyde on a dioxy-diphenyl sulphone in an alkaline solution and subsequent condensation with an aromatic sulphonic acid under acid conditions.

According to this invention, by heating a dioxydiphenyl sulphone together with formaldehyde and a sulphonic acid of a phenol in an alkaline solution valuable tanning substances are obtained without the separation of deleterious resins, whereas, as is known, the condensation of dioxydiphenyl sulphones with formaldehyde alone under alkaline conditions leads to resins which are insoluble in water (compare German specification No. 464,088).

The possibility of combining the components directly in an alkaline medium could not be expected in view of previous knowledge. Furthermore it is no longer necessary, as it is in the process of the U. S. specification No. 901,536, to prepare the dioxy-diphenyl sulphone in a separate operation, but this can be prepared and further condensed in one operation; this possibility renders the process simpler and more economical.

Leather prepared with the aid of the tanning substances of the present invention resembles, in respect of its fullness, that prepared with the agents described in the U. S. specification No. 1,901,536 but is in many cases distinguished by an improved fastness to light. Obviously in the present case as well as in the aforesaid application Ser. No. 629,239 there is question of the para-derivative of dioxy-diphenyl sulphone.

The following example illustrates the invention, the parts being by weight:—

180 parts of oleum of 63 per cent strength are added in the cold to 216 parts of crude cresol D. A. B. IV and the mixture is then heated for half an hour at 90°–100° C. 150 parts of crude phenol, consisting of a mixture of ortho-cresol and phenol, are then added and the reaction mixture is heated for one hour at 170° C. whilst air is passed through it. At the end of this operation the mixture contains about 172 parts of cresol sulphonic acid and 280 parts of p-dioxydiphenyl sulphone and methyl derivatives thereof. After addition of a further 100 parts of cresol sulphonic acid the whole is neutralized, then subjected to steam distillation to remove excess of phenols, rendered alkaline to phenolphthalein by means of caustic alkali solution and then heated to boiling with the addition of 150 parts of formaldehyde solution of 30 per cent strength. After heating has been continued for about 6–8 hours the reaction mixture is rendered faintly acid, whereby there is obtained a solution ready for use for tanning and having the same tanning properties as the products described in the parent specification. By conducting the condensation under pressure the duration of the heating operation can be reduced.

What I claim is:—

1. A process for the manufacture of tanning substances, consisting in heating a dioxy-diphenyl sulphone with formaldehyde and a sulphonic acid of a phenol in an alkaline solution.

2. A process for the manufacture of tanning substances, consisting in heating a dioxy-diphenyl sulphone with formaldehyde and a sulphonic acid of cresol in an alkaline solution.

3. A tanning substance consisting of the product of reaction of a dioxy-diphenyl sulphone with formaldehyde and a sulphonic acid of a phenol in an alkaline solution.

JOSEF SCHÄFER.